United States Patent
Amamiya et al.

(10) Patent No.: US 10,801,938 B2
(45) Date of Patent: Oct. 13, 2020

(54) VISCOMETER USING REACTION TORQUE MEASUREMENT BASED ON ROTATIONAL PHASE DIFFERENCE

(71) Applicant: ATAGO CO., LTD., Tokyo (JP)

(72) Inventors: Hideyuki Amamiya, Tokyo (JP); Yoshinori Nakajima, Saitama (JP)

(73) Assignee: ATAGO CO., LTD., Tokyo (JP)

( * ) Notice: Subject to any disclaimer, the term of this patent is extended or adjusted under 35 U.S.C. 154(b) by 0 days.

(21) Appl. No.: 14/995,751

(22) Filed: Jan. 14, 2016

(65) Prior Publication Data

US 2016/0356690 A1  Dec. 8, 2016

(30) Foreign Application Priority Data

Jun. 8, 2015  (JP) .................................. 2015-115727

(51) Int. Cl.
*G01N 11/14*  (2006.01)

(52) U.S. Cl.
CPC .................... *G01N 11/14* (2013.01)

(58) Field of Classification Search
CPC ...................................................... G01N 11/14
USPC ....................................................... 73/54.35
See application file for complete search history.

(56) References Cited

U.S. PATENT DOCUMENTS

| | | | |
|---|---|---|---|
| 2,519,378 A | 8/1950 | Kilpatrick | |
| 4,347,734 A * | 9/1982 | Heinz | G01N 11/14 73/54.33 |
| 4,432,245 A | 2/1984 | Hattori et al. | |
| 5,201,214 A * | 4/1993 | Sekiguchi | G01N 11/14 73/54.33 |
| 5,287,732 A | 2/1994 | Sekiguchi | |
| 7,549,324 B2 * | 6/2009 | Haapasaari | G01N 11/14 73/53.03 |
| 2007/0193344 A1 | 8/2007 | Haapasaari et al. | |
| 2007/0277595 A1 | 12/2007 | Lundberg et al. | |

FOREIGN PATENT DOCUMENTS

| | | |
|---|---|---|
| CH | 427343 | 6/1967 |
| CN | 101606050 | 12/2009 |
| CN | 102590042 | 7/2012 |

(Continued)

OTHER PUBLICATIONS

DE102004029211 Machine Translation of Description, espacenet.*

(Continued)

*Primary Examiner* — Nimeshkumar D Patel
*Assistant Examiner* — Jean F Morello
(74) *Attorney, Agent, or Firm* — Greenblum & Bernstein, P.L.C.

(57) ABSTRACT

A viscometer capable of measuring a viscosity in high precision by increasing a transmission efficiency of a rotational torque while simplifying a structure and facilitating a down-sizing is provided. A viscometer includes: a hollow shaft motor; a needle shaft piercing through a hollow driving shaft of the hollow shaft motor and having an upper end side and a lower end side supported to be rotatable; a spring configured to transmit a driving force of the hollow shaft motor to the needle shaft; a spindle attached to the lower end side of the needle shaft; and a phase difference detection unit configured to detect a rotational phase difference between the hollow driving shaft 4 and the needle shaft.

11 Claims, 3 Drawing Sheets

(56) References Cited

FOREIGN PATENT DOCUMENTS

| | | | |
|---|---|---|---|
| DE | 10 2004 029 211 | 3/2005 | |
| EP | 2108113 | 4/2018 | |
| GB | 2058341 a * | 4/1981 | ............ G01N 11/14 |
| JP | 46-2239 | 1/1971 | |
| JP | 59-113746 | 8/1984 | |
| JP | 2-251741 | 10/1990 | |
| JP | 07-128212 | 5/1995 | |
| JP | 11-311594 | 11/1999 | |
| JP | 3475019 | 9/2003 | |
| JP | 2005-049214 | 2/2005 | |
| JP | 2005-49214 | 2/2005 | |

OTHER PUBLICATIONS

Noria Corporation. "'The Case for Hollow Shaft Motors.'" Reliable Plant, Noria Corporation, Sep. 21, 2011, www.reliableplant.com.*
Extended European Search Report for EP Appl. No. 16 15 1771.9 dated Sep. 23, 2016.
Notice of Opposition and Grounds of Opposition in EPO Counterpart Patent Appl. No. 16151771.9/U.S. Pat. No. 3,104,159, dated Aug. 6, 2018, with English language translation of Grounds of Opposition.
Official Action issued from Japan Patent Office (JPO) in Japanese Patent Application No. 2015-115727, dated Jun. 4, 2019.

\* cited by examiner

VISCOMETER USING REACTION TORQUE MEASUREMENT BASED ON ROTATIONAL PHASE DIFFERENCE

CROSS-REFERENCE TO RELATED APPLICATIONS

This application claims benefit of priority to Japanese Patent Application No. 2015-115727 filed on Jun. 8, 2015, the entire contents of which are incorporated by reference herein.

FIELD OF THE INVENTION

The present invention relates to a viscometer for measuring a viscosity of a sample by rotating a spindle in the sample and measuring a reaction torque.

BACKGROUND OF THE INVENTION

Conventionally, there are various schemes that have been proposed as a viscometer for measuring a viscosity of a sample liquid. For example, as a viscometer of the scheme similar to a viscometer as described in Japanese Patent No. 3,475,019, as shown in FIG. 3, one in which a cylindrical spindle 102 is rotated in a sample liquid 101, a reaction torque with respect to this rotation is measured, and a viscosity of the sample liquid is calculated has been proposed.

This viscometer has a pulse motor 103, and the spindle 102 that is immersed in the sample liquid 101 is rotated by a driving force of this pulse motor 103. To a driving shaft 104 of the pulse motor 103, a first metal shaft 106 is connected via a shaft coupler 105. This first metal shaft 106 is supported to be rotatable by a first base 108 via a first through bearing 107. This first base 108 is fixed to a chassis not shown in the figure. The first metal shaft 106 has a hollow lower end side.

To the first metal shaft 106, a first rotor plate 109 is attached. To the first rotor plate 109, a coupling plate 111 is attached via a coupling pin 110. This coupling plate 111 is connected to a second metal shaft 112. This second metal shaft 112 is supported to be rotatable by a second base 114 via a second through bearing 113. This second base 114 is fixed to the chassis not shown in the figure. The second metal shaft 112 is a hollow cylindrical shaft, which is made to be coaxial with the first Metal shaft 106.

In a vicinity of a lower end portion of the second metal shaft 112, a first pivot crank 115 is attached. This first pivot crank 115 is a C-shaped member, and its upper end side is attached to a vicinity of the lower end portion of the second metal shaft 112. A lower end side of the first pivot crank 115 is positioned on an axis of the second metal shaft 112. On an upper face of the lower end side of the first pivot crank 115, a jewel bearing 116 is attached.

Then, between a hollow portion on the lower end side of the first metal shaft 106 and the jewel bearing 116, a needle shaft 117 is disposed by piercing through the hollow portion of the second metal shaft 112. An upper end portion of this needle shaft 117 is supported to be rotatable at a lower end side (a bottom part of the hollow portion) of the first metal shaft 106 via a bearing 122. A lower end portion of the needle shaft 117 is made to be a conical protrusion, and supported to be ratatable at this protrusion by the jewel bearing 116. This needle shaft 117 is made to be coaxial with the first metal shaft 106 and the second metal shaft 112.

In a vicinity of a lower end portion of the needle shaft 117, a second pivot crank 118 is attached. This second pivot crank 118 is a C-shaped member, and its upper end side is attached to a vicinity of the lower end portion of the needle shaft 117. A lower end side of the second pivot crank 118 is positioned on an axis of the needle shaft 117. On a lower face of the lower end side of the second pivot crank 118, a spindle holder 119 is attached. To this spindle holder 119, the spindle 102 is attached coaxially to be detachable.

A section between the first rotor plate 109 and the needle shaft 117 is coupled by a spiral shaped spiral spring 120. An end portion on a center side of the spiral spring 102 is fixed to an upper end side portion of the needle shaft 117. An end portion on an outer circumferential side of the spiral spring 120 is fixed to the first rotor plate 109. Also, to an upper end side portion of the needle shaft 117, a second rotor plate 121 that is parallel to the first rotor plate 109 is attached.

In this viscometer, when the pulse motor 103 is driven and the driving shaft 104 is operated in rotation, the first metal shaft 106, the first rotor plate 109, the coupling plate 111, the second metal shaft 112 and the first pivot crank 115 are operated in rotation with the identical speed as the driving shaft 104 by this driving force. At this point, a rotational force of the first rotor plate 109 is transmitted to the needle shaft 117 via the spiral spring 120, and operates the needle shaft 117 in rotation. When the needle shaft 117 is operated in rotation, the second rotor plate 121, the second pivot crank 118, the spindle holder 119 and the spindle 102 are operated in rotation with the identical speed as the needle shaft 117.

At this point, if the viscosity of the sample liquid 101 is zero, the spindle 102 receives no resistance against rotating, so that the spiral spring 120 is not displaced, and the needle shaft 117 and the second rotor plate 121 are rotated with the identical speed and the identical phase as the first metal shaft 106 and the first rotor plate 109.

When the viscosity of the sample liquid 101 is non-zero, the spindle 102 receives a resistance against rotating, so that the spiral spring 120 is displaced by this reaction torque, and the needle shaft 117 and the second rotor plate 121 are rotated with a phase delayed with respect to the first metal shaft 106 and the first rotor plate 109. In a state where the reaction torque due to a resistance of the sample liquid 101 and a torque due to a recovering force of the displaced spiral spring 120 are balanced, the rotational speed of the needle shaft 117 and the second rotor plate 121 becomes the identical speed as the rotational speed of the first metal shaft 106 and the first rotor plate 109, and a phase delay corresponding to a displacement amount of the spiral spring 120 is maintained to be constant. In this state, when a phase difference between the first rotor plate 109 and the second rotor plate 121 is detected, it is possible to calculate the viscosity of the sample liquid 101 from this phase difference.

In the conventional viscometer as described above, from the first metal shaft 106 up to the second metal shaft 112 and the first pivot crank 115 are coupled to the driving shaft 104, and their inertial mass is large, so that a large driving force is required, and it is difficult to make the pulse motor 103 compact. Also, it is difficult to use one with a variable adjustable speed as the pulse motor 103, in order to avoid a larger size of the pulse motor 103.

Also, with respect to these members that are coupled to the driving shaft 104, the pulse motor 103 is in a state of cantilever support, so that it is difficult to make the device configuration compact. Moreover, as the pulse motor 103 is cantilever supporting these members, an inclination of the axis is prone to occur, and in order to prevent an inclination, it is inevitable to make the members such as bearing and the like in a large size. Also, a transmission loss of the rotational torque is prone to occur, so that the viscosity measurement in high precision is difficult.

SUMMARY OF THE INVENTION

The present invention has been achieved in view of the above described problems, and has an object of providing a viscometer capable of measuring a viscosity in high precision by increasing a transmission efficiency of a rotational torque, while simplifying a structure and facilitating a down-sizing.

In order to resolve the above described problems and achieve the above noted object, the viscometer according to the present invention has the following configuration.

[Configuration I]

A viscometer, comprising: a hollow shaft motor to be a driving source fixed to a chassis; a needle shaft, provided to be piercing through a hollow driving shaft of the hollow shaft motor, having an upper end side supported to be rotatable by the chassis and a lower end side supported to be rotatable by a lower end side of the hollow driving shaft; a spring configured to transmit a driving power of the hollow shaft motor to the needle shaft; a spindle holder, provided on the lower end side of the needle shaft, to which a spindle is attached to be detachable; and a phase difference detection unit configured to detect a rotational phase difference between the hollow driving shaft and the needle shaft; wherein when the spindle attached to the spindle holder is immersed into a sample liquid and the hollow shaft motor is driven, the spring is displaced due to a reaction torque caused by a resistance due to a viscosity of the sample liquid with respect to the spindle, the rotational phase difference between the hollow driving shaft and the needle shaft is detected in a state where a torque caused by a recovering force of the displaced spring and the reaction torque are balanced, and a viscosity of the sample liquid is determined according to the detected rotational phase difference.

[Configuration II]

In the viscometer having the configuration I, an upper end side of the needle shaft is supported to be rotatable by the chassis via bearings; the lower end side of the needle shaft is supported to be rotatable by a C-shaped first pivot crank attached to the lower end side of the hollow driving shaft; the spindle holder is attached to a C-shaped second pivot crank attached to the lower end side of the needle shaft; and the rotational phase difference between the hollow driving shaft and the needle shaft is detected by detecting a rotational phase difference between the first pivot crank and the second pivot crank.

In the viscometer according to the present invention having the configuration I, the hollow shaft motor to be a driving source and the needle shaft provided to be piercing through a hollow driving shaft of this hollow shaft motor are provided, and a viscosity of the sample liquid is determined by detecting the rotational phase difference between the hollow driving shaft and the needle shaft, so that a structure is simple and a down-sizing is facilitated, while a transmission efficiency of the rotational torque is increased so that a viscosity measurement in high precision is possible.

In the viscometer according to the present invention having the configuration II, the upper end side of the needle shaft is supported to be rotatable by the chassis via bearings, and the lower end side of the needle shaft is supported to be rotatable by a C-shaped first pivot crank attached to the lower end side of the hollow driving shaft, so that the inclination of the needle shaft can be prevented, and the rotational resistance of the needle shaft can be made extremely low, so that a viscosity measurement in high precision is possible.

Namely, the present invention is capable of providing a viscometer capable of measuring a viscosity in high precision by increasing a transmission efficiency of a rotational torque, while simplifying a structure and facilitating a down-sizing.

DETAILED DESCRIPTION OF THE INVENTION

In the following, the embodiment of the present invention will be described with references to the drawings.

Figure 1:
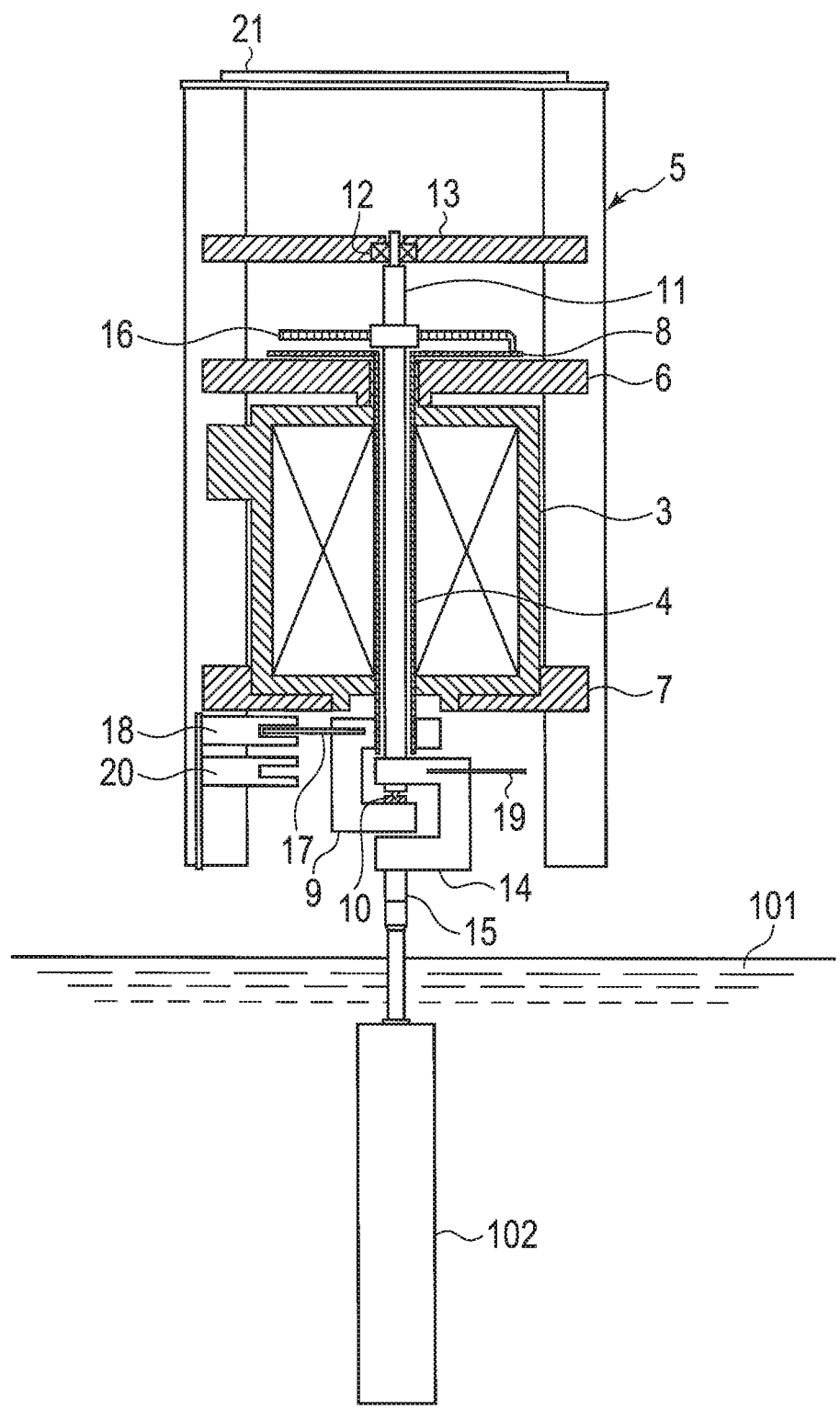
FIG. 1 is a longitudinal cross sectional view showing a configuration of a viscometer according to one embodiment of the present invention.

FIG. 1 is a longitudinal cross sectional view showing a configuration of a viscometer according to one embodiment of the present invention.

As shown in FIG. 1, the viscometer according to the present invention is a device in which a cylindrical spindle 102 is rotated in a sample liquid 101, a reaction torque with respect to this rotation is measured, and a viscosity of the sample liquid is calculated.

This viscometer has a hollow shaft motor 3 to be a driving source, and the spindle 102 that is immersed in the sample liquid 101 is rotated by a driving force of this hollow shaft motor 3. A hollow driving shaft 4 of the hollow shaft motor 3 is formed in a hollow cylindrical shape. The hollow shaft motor 3 is fixed at an upper end side and a lower end side by a first base 6 and a second base 7 that constitute a chassis 5. On an upper end portion of the hollow driving shaft 4 of the hollow shaft motor 3, a rotor plate 8 is attached.

Note that the hollow shaft motor 3 is a pulse motor, and it is possible to use a dry cell as its driving power source. Also, the hollow shaft motor 3 is capable of making a rotational speed adjustment.

In a vicinity of a lower end portion of the hollow driving shaft 4 of the hollow shaft motor 3, a first pivot crank 9 is attached. This first pivot crank 9 is a C-shaped member, and its upper end side is attached to a vicinity of the lower end portion of the hollow driving shaft 4. A lower end side of the first pivot crank 9 is positioned on an axis of the hollow driving shaft 4. On an upper face of the lower end side of the first pivot crank 9, a jewel bearing 10 is attached.

Then, a needle shaft 11 is disposed by piercing through the hollow driving shaft 4 of the hollow shaft motor 3. An upper end portion of this needle shaft 11 is supported to be rotatable by a third base 13 that constitutes the chassis 5 via a bearing 12. A lower end portion of the needle shaft 11 is made to be a conical protrusion, and supported to be rotatable at this protrusion by the jewel bearing 10 on the lower end side of the hollow driving shaft 4. This needle shaft 11 is made to be coaxial with the hollow driving shaft 4.

In a vicinity of a lower end portion of the needle shaft 11, a second pivot crank 14 is attached. This second pivot crank 14 is a C-shaped member, and its upper end side is attached to a vicinity of the lower end portion of the needle shaft 11. A lower end side of the second pivot crank 14 is positioned on an axis of the needle shaft 11. On a lower face of the lower end side of the second pivot crank 14, a spindle holder 15 is attached. To this spindle holder 15, the spindle 102 is attached coaxially to be detachable.

The spindle 102 can be exchanged with that of a different material, size and shape, depending on a type and a viscosity of the sample liquid for which the viscosity is to be measured. The sample liquid in which this spindle 102 is to be immersed is preferably contained in a container that is as large as possible, and preferably at least 500 ml of the sample liquid is contained in the container.

A section between the rotor plate 8 and the needle shaft 11 is coupled by a spiral shaped spiral spring 16. This spiral spring 16 is a spring for transmitting a driving force of the hollow shaft motor 3 to the needle shaft 11. An end portion on a center side of the spiral spring 16 is fixed to an upper end side portion of the needle shaft 11. An end portion on an outer circumferential side of the spiral spring 16 is fixed to the rotor plate 8.

Then, this viscometer has a phase difference detection unit for detecting a rotational phase difference between the hollow driving shaft 4 and the needle shaft 11. Namely, on a side face portion of the first pivot crank 9, a first segment to be detected 17 is attached. This first segment to be detected 17 is detected by a first interrupter 18 attached to the chassis 5. The first interrupter 18 detects a passage of the first segment to be detected 17 once during one rotation of the first pivot crank 9.

Also, on a side face portion of the second pivot crank 14, a second segment to be detected 19 is attached. This second segment to be detected 19 is detected by a second interrupter 20 attached to the chassis 5. The second interrupter 20 detects a passage of the second segment to be detected 19 once during one rotation of the second pivot crank 14.

Note that, on the chassis 5, a display unit 21 comprising a liquid crystal display panel or an organic EL display panel is provided.

In this viscometer, by detecting a rotational phase difference between the hollow driving shaft 4 and the needle shaft 11, the viscosity (mPa·S) of the sample liquid 101 is obtained according to the detected rotational phase difference. Namely, in this viscometer, when the hollow shaft motor 3 is driven and the hollow driving shaft 4 is operated in rotation, the rotor plate 8 is operated in rotation with the identical speed as the hollow driving shaft 4 by this driving force. At this point, a rotational force of the rotor plate 8 is transmitted to the needle shaft 11 via the spiral spring 16, and operates the needle shaft 11 in rotation. When the needle shaft 11 is operated in rotation, the second pivot crank 14, the spindle holder 15 and the spindle 102 are operated in rotation with the identical speed as the needle shaft 11.

At this point, if the viscosity of the sample liquid 101 is zero, the spindle 102 receives no resistance against rotating, so that the spiral spring 16 is not displaced, and the needle shaft 11 is rotated with the identical speed and the identical phase as the rotor plate 8.

When the viscosity of the sample liquid 101 is non-zero, the spindle 102 receives a resistance against rotating, so that the spiral spring 16 is displaced by this reaction torque, and the needle shaft 11 is rotated with a phase delayed with respect to the rotor plate 8. In a state where the reaction torque due to a resistance of the sample liquid 101 and a torque due to a recovering force of the displaced spiral spring 16 are balanced, the rotational speed of the needle shaft 11 becomes the identical speed as the rotational speed of the rotor plate 8, and a phase delay corresponding to a displacement amount of the spiral spring 16 is maintained to be constant. In this state, when a phase difference between the hollow driving shaft 4 and the needle shaft 11, that is a phase difference between the first pivot crank 9 and the second pivot crank 14, is detected, it is possible to calculate the viscosity of the sample liquid 101 from this phase difference.

Figure 2:
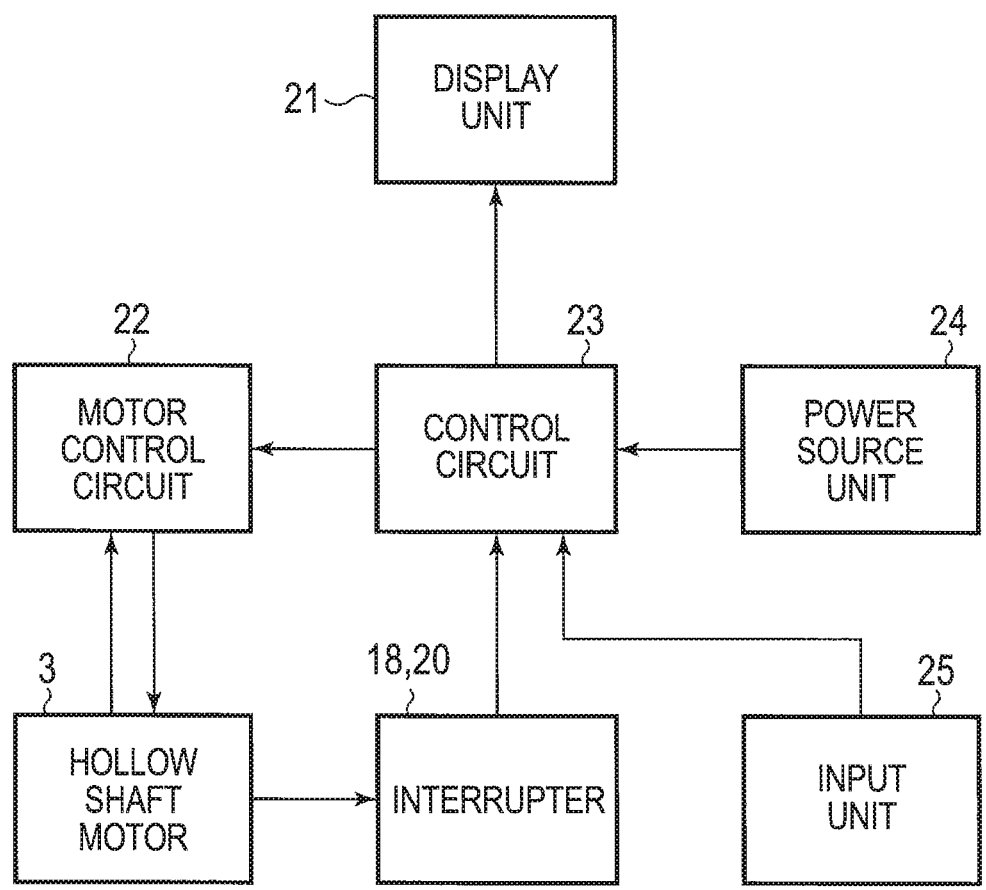
FIG. 2 is a block diagram showing a configuration of a viscometer according to one embodiment of the present invention.
Figure 3:
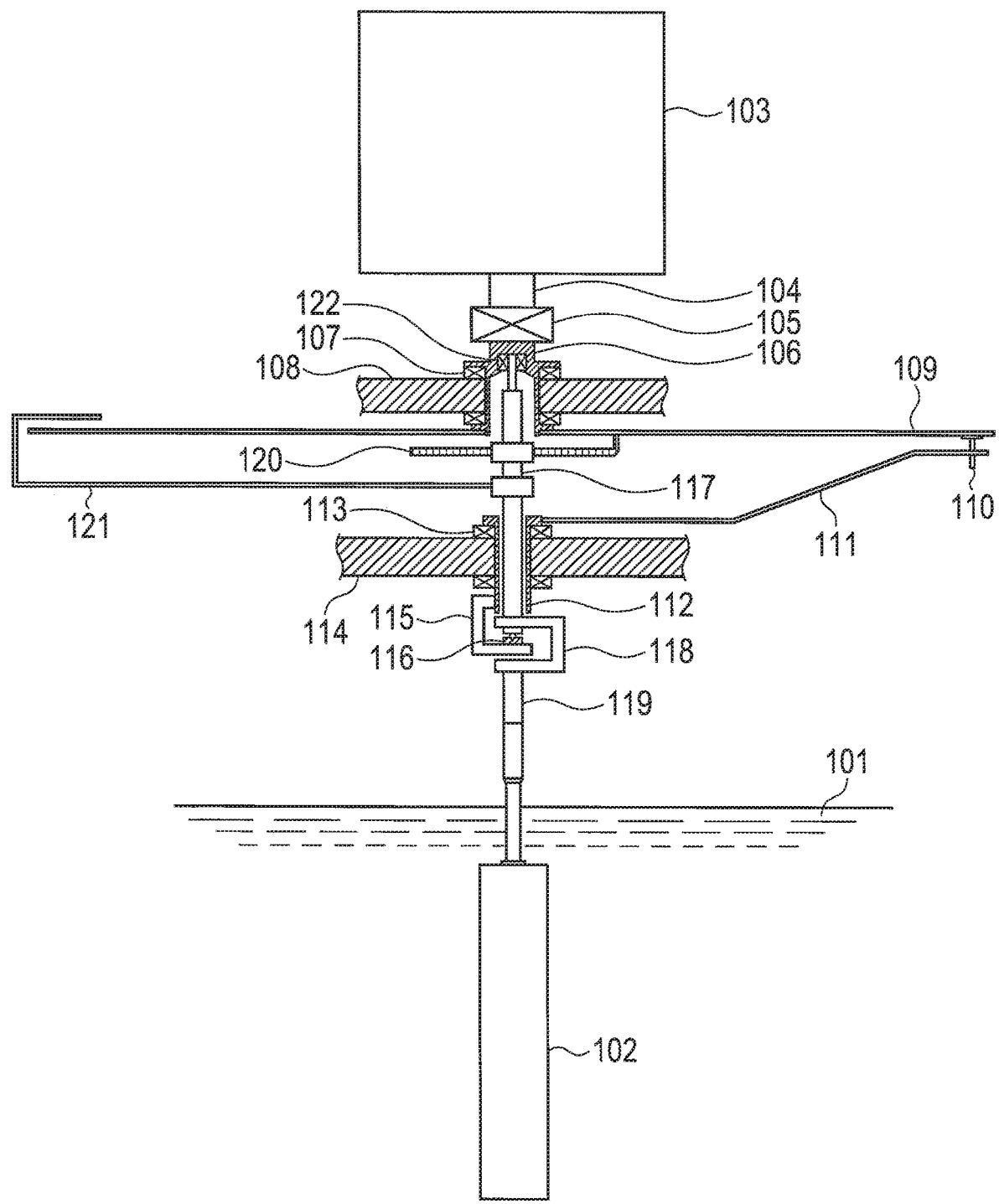
FIG. 3 is a longitudinal cross sectional view showing a configuration of a prior art viscometer.

FIG. 2 is a block diagram showing a configuration of the viscometer according to one embodiment of the present invention.

As shown in FIG. 2, in this viscometer, the hollow shaft motor 3 is controlled by a motor control circuit 22, as to its activation, stopping, and rotational speed. The motor control circuit 22 is controlled by a control circuit 23 for controlling this device as a whole. The control circuit 23 operates as a power is supplied from a power source unit 24. Also, the power source unit 24 supplies a driving power to the hollow shaft motor 3 and other units. This power source unit 24 supplies the driving power to respective units of this device by being supplied with a power from a commercial AC power source, or a dry cell or a battery.

Also, to the control circuit 23, various control signals can be inputted from an input unit 25. These control signals are signals for activating or stopping the operation of this device, and instructing the rotational speed of the hollow shaft motor 3 (the rotational speed adjustment) and the like.

The detection signals indicating the detections of the first and second segments to be detected 17 and 19 by the first and second interrupters 18 and 20 are sent to the control circuit 23. The control circuit 23 calculates the viscosity of the sample liquid 101 according to the detection signals sent from the first and second interrupters 18 and 20.

Also, the control circuit 23 carries out a prescribed display on the display unit 21. The contents to be displayed on the display unit 21 may include at least one of the viscosity (mPa·S) of the sample liquid 101 that is measured (calculated), the rotational speed of the hollow shaft motor 3, the rotational phase difference between the first pivot crank 9 and the second pivot crank 14, the power on/off state, and the like.

The present invention is applicable to a viscometer for measuring a viscosity of a sample by rotating a spindle in the sample and measuring a reaction torque.

Although the present invention has been fully described in connection with the preferred embodiment thereof with reference to the accompanying drawings, it is apparent to those skilled in the art that changes and modifications are to be understood as included within the scope of the present invention as defined by the appended claims.

What is claimed is:

1. A viscometer, comprising:
    a hollow shaft motor to be a driving source of the viscometer fixed to a chassis, the hollow shaft motor having a hollow driving shaft in a hollow cylindrical shape penetrating through the hollow shaft motor along a rotational axis;
    a needle shaft, provided to be piercing through the hollow driving shaft of the hollow shaft motor, having
        an upper end side located above the hollow driving shaft, supported to be rotatable by a base which constitutes the chassis and through which the upper end side of the needle shaft penetrates, and
        a lower end side located below the hollow driving shaft, supported to be rotatable by a lower end side of the hollow driving shaft, such that an entire part of the hollow driving shaft of the hollow shaft motor is located between the upper end side of the needle shaft and the lower end side of the needle shaft and no other motor is present above the needle shaft;
a spring to transmit a driving power of the hollow shaft motor to the needle shaft;
a spindle holder, provided on the lower end side of the needle shaft, to which a spindle is attached to be detachable; and
a phase difference detector to detect a rotational phase difference between the hollow driving shaft and the needle shaft;
wherein when the spindle attached to the spindle holder is immersed into a sample liquid and the hollow shaft motor is driven, the spring is displaced due to a reaction torque caused by a resistance due to a viscosity of the sample liquid with respect to the spindle, the rotational phase difference between the hollow driving shaft and the needle shaft is detected by the phase difference detector in a state where a torque caused by a recovering force of the displaced spring and the reaction torque are balanced, and a viscosity of the sample liquid is determined according to the detected rotational phase difference.

2. The viscometer of claim 1, wherein:
the upper end side of the needle shaft is supported to be rotatable by the chassis via bearings;
the lower end side of the needle shaft is supported to be rotatable by a C-shaped first pivot crank attached to the lower end side of the hollow driving shaft;
the spindle holder is attached to a C-shaped second pivot crank attached to the lower end side of the needle shaft; and
the rotational phase difference between the hollow driving shaft and the needle shaft is detected by the phase difference detector by detecting a rotational phase difference between the first pivot crank and the second pivot crank.

3. The viscometer of claim 1, wherein the hollow driving shaft is to be rotatably driven by the hollow shaft motor.

4. The viscometer of claim 1, wherein the spring is to transmit the driving power of the hollow shaft motor to the needle shaft via the hollow driving shaft such that when the hollow shaft motor is driven, the driving power is transmitted from the hollow driving shaft through the spring to the needle shaft.

5. The viscometer of claim 1, further comprising:
a controller that is configured to calculate the viscosity of the sample liquid based upon the rotational phase difference detected by the phase difference detector such that the viscosity of the sample liquid is determined by the controller based upon the detected rotational phase difference.

6. A viscometer, comprising:
a hollow shaft motor to be a driving source of the viscometer fixed to a chassis, the hollow shaft motor having a hollow driving shaft in a hollow cylindrical shape penetrating through the hollow shaft motor along a rotational axis;
a needle shaft, provided to be piercing through the hollow driving shaft of the hollow shaft motor, having
an upper end side located above the hollow driving shaft, directly supported to be rotatable by a bearing fixed to the chassis, and
a lower end side located above the hollow driving shaft, supported to be rotatable by a lower end side of the hollow driving shaft,
such that an entire part of the hollow driving shaft of the hollow shaft motor is located between the upper end side of the needle shaft and the lower end side of the needle shaft;
a spring to transmit a driving power of the hollow shaft motor to the needle shaft;
a spindle holder, provided on the lower end side of the needle shaft, to which a spindle is attached to be detachable; and
a phase difference detector to detect a rotational phase difference between the hollow driving shaft and the needle shaft;
wherein when the spindle attached to the spindle holder is immersed into a sample liquid and the hollow shaft motor is driven, the spring is displaced due to a reaction torque caused by a resistance due to a viscosity of the sample liquid with respect to the spindle, the rotational phase difference between the hollow driving shaft and the needle shaft is detected by the phase difference detector in a state where a torque caused by a recovering force of the displaced spring and the reaction torque are balanced, and a viscosity of the sample liquid is determined according to the detected rotational phase difference.

7. A viscometer, comprising:
a hollow shaft motor fixed to a chassis, the hollow shaft motor having a hollow driving shaft in a hollow cylindrical shape penetrating through the hollow shaft motor along a rotational axis;
a needle shaft, provided to be piercing through the hollow driving shaft of the hollow shaft motor, having
an upper end side supported to be rotatable and
a lower end side supported to be rotatable by a lower end side of the hollow driving shaft,
such that the hollow shaft motor is located between the upper end side of the needle shaft and the lower end side of the needle shaft;
a spring to transmit a driving power of the hollow shaft motor to the needle shaft, and the spring is located above the hollow shaft motor;
a spindle holder, provided on the lower end side of the needle shaft, to which a spindle is attached to be detachable; and
a phase difference detector to detect a rotational phase difference between the hollow driving shaft and the needle shaft, and the phase difference detector is located below the hollow shaft motor;
wherein when the spindle attached to the spindle holder is immersed into a sample liquid and the hollow shaft motor is driven, the spring is displaced due to a reaction torque caused by a resistance due to a viscosity of the sample liquid with respect to the spindle, the rotational phase difference between the hollow driving shaft and the needle shaft is detected by the phase difference detector in a state where a torque caused by a recovering force of the displaced spring and the reaction torque are balanced, and a viscosity of the sample liquid is determined according to the detected rotational phase difference.

8. The viscometer of claim 7, further comprising:
a rotor plate attached to the hollow driving shaft and located above the hollow shaft motor, wherein the spring is a spiral spring which has a first end fixed to the upper end side of the needle shaft and a second end fixed to the rotor plate.

9. The viscometer of claim 7, wherein the upper end side of the needle shaft is supported to be rotatable by a base which constitutes the chassis and through which the upper end side of the needle shaft penetrates.

10. The viscometer of claim 9, wherein:
the upper end side of the needle shaft is supported to be rotatable by the base via bearings;
the lower end side of the needle shaft is supported to be rotatable by a C-shaped first pivot crank attached to the lower end side of the hollow driving shaft;
the spindle holder is attached to a C-shaped second pivot crank attached to the lower end side of the needle shaft;
a first segment is attached on a side face portion of the C-shaped first pivot crank, and a passage of the first segment is detected once during one rotation of the first pivot crank;
a second segment is attached on a side face portion of the C-shaped second pivot crank, and a passage of the second segment is detected once during one rotation of the second pivot crank; and
the rotational phase difference between the hollow driving shaft and the needle shaft is detected by the phase difference detector by detecting a rotational phase difference between the first segment and the second segment.

11. A viscometer, comprising:
a chassis;
a hollow shaft motor supported on the chassis, the hollow shaft motor comprising a main body fixed to the chassis, and a hollow driving shaft in a hollow cylindrical shape penetrating through the main body along a rotational axis;
a rotor plate attached to the hollow driving shaft and located above a point at which the main body of the hollow shaft motor is fixed to the chassis;
a bearing located above an upper end of the hollow driving shaft and above the rotor plate;
a needle shaft extending through the hollow driving shaft, the rotor plate, and the bearing, an entire part of the needle shaft being rotatable relative to the hollow driving shaft, the rotor plate, and the bearing, the needle shaft including
an upper end portion a part of which is located above an upper end of the bearing, the upper end portion being directly and rotatably supported by the bearing, and
a lower end portion located below a lower end of the hollow driving shaft, the lower end portion being rotatably supported by the hollow driving shaft;
a spring located above the rotor plate to transmit a driving power of the hollow shaft motor to the needle shaft, the spring including a first end fixed to the needle shaft and a second end fixed to an outer peripheral part of the rotor plate;
a spindle holder, provided on the lower end portion of the needle shaft, to which a spindle is detachably attached; and
a phase difference detector to detect a rotational phase difference between the hollow driving shaft and the needle shaft;
wherein when the spindle attached to the spindle holder is immersed into a sample liquid and the hollow shaft motor is driven, the spring is displaced due to a reaction torque caused by a resistance due to a viscosity of the sample liquid with respect to the spindle, the rotational phase difference between the hollow driving shaft and the needle shaft is detected by the phase difference detector in a state where a torque caused by a recovering force of the displaced spring and the reaction torque are balanced, and a viscosity of the sample liquid is determined according to the detected rotational phase difference.

\* \* \* \* \*